(12) United States Patent
Brunnmair

(10) Patent No.: US 8,999,042 B2
(45) Date of Patent: Apr. 7, 2015

(54) CYCLONE HAVING A PURE GAS LINE

(75) Inventor: Erwin Brunnmair, Graz (AT)

(73) Assignee: Binder + Co AG, Gleisdorf (AT)

( * ) Notice: Subject to any disclaimer, the term of this patent is extended or adjusted under 35 U.S.C. 154(b) by 428 days.

(21) Appl. No.: 13/386,181

(22) PCT Filed: Jul. 8, 2010

(86) PCT No.: PCT/AT2010/000250
§ 371 (c)(1),
(2), (4) Date: Feb. 21, 2012

(87) PCT Pub. No.: WO2011/009148
PCT Pub. Date: Jan. 27, 2011

(65) Prior Publication Data
US 2012/0272825 A1    Nov. 1, 2012

(30) Foreign Application Priority Data

Jul. 23, 2009  (AT) ................................ GM465/2009

(51) Int. Cl.
*B01D 45/12*   (2006.01)
*B04C 5/081*   (2006.01)
*B04C 5/04*    (2006.01)
*B04C 5/13*    (2006.01)
*B04C 9/00*    (2006.01)

(52) U.S. Cl.
CPC ............... *B04C 5/081* (2013.01); *B01D 45/12* (2013.01); *B04C 5/04* (2013.01); *B04C 5/13* (2013.01); *B04C 2009/008* (2013.01)

(58) Field of Classification Search
USPC ............ 55/337, 339, 459.1, 434, 400; 95/271
See application file for complete search history.

(56) References Cited

U.S. PATENT DOCUMENTS

| 3,855,951 | A | * | 12/1974 | Giles ............................ 110/216 |
| 4,134,827 | A |   | 1/1979  | Frykhult |
| 4,212,653 | A |   | 7/1980  | Giles |
| 4,257,786 | A | * | 3/1981  | Sogo et al. ...................... 96/372 |
| 4,278,452 | A | * | 7/1981  | Ido et al. ......................... 96/372 |
| 6,979,358 | B2|   | 12/2005 | Ekker et al. |

FOREIGN PATENT DOCUMENTS

| DE | 20 47 534     | 4/1972 |
| DE | 29 25 245     | 1/1980 |
| DE | 42 17 016     | 11/1993 |
| DE | 43 13 337     | 11/1994 |
| DE | 601 17 051    | 8/2006 |
| DE | 20 2008 003 366 | 5/2008 |
| FR | 2 281 791     | 3/1976 |

OTHER PUBLICATIONS

International Search Report of PCT/AT2010/000250, date of mailing Nov. 22, 2010.

* cited by examiner

*Primary Examiner* — Jason M Greene
*Assistant Examiner* — Dung H Bui
(74) *Attorney, Agent, or Firm* — Collard & Roe, P.C.

(57) ABSTRACT

A cyclone for separating solid particles from an exhaust gas flow includes a housing with a jacket area that is cylindrical at least in some sections, with a cover area, and with a bottom area. An exhaust gas line opens into an inlet opening and is for an exhaust gas flow mixed with solid particles. A discharge opening is for the solid particles separated from the exhaust gas flow. An immersion pipe has a penetration area passing through the housing and has an open end area protruding into the interior of the housing and used as an outlet opening for the purified exhaust gas flow from the housing. At least one pure gas line supplies pure gas, creating a second boundary layer flow to replace a first boundary layer flowing having an increased concentration of solid particles.

16 Claims, 5 Drawing Sheets

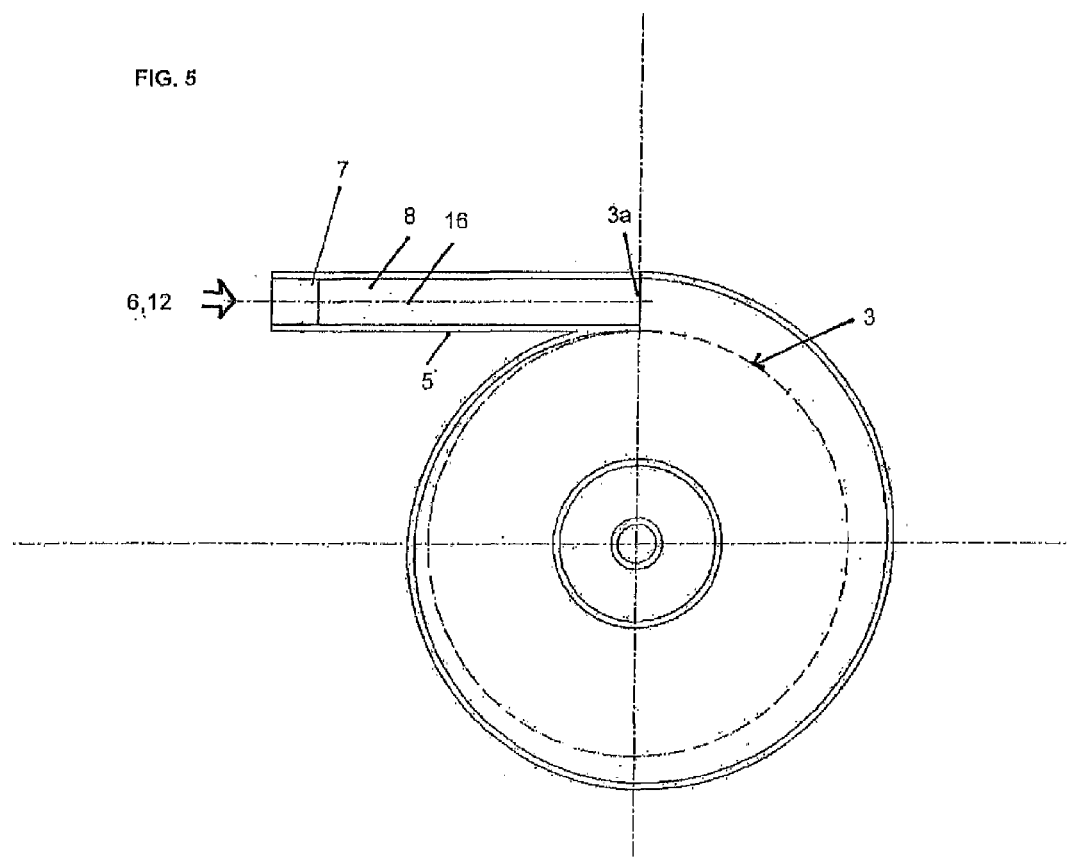

CYCLONE HAVING A PURE GAS LINE

CROSS REFERENCE TO RELATED APPLICATIONS

This application is the National Stage of PCT/AT2010/000250 filed on Jul. 8, 2010, which claims priority under 35 U.S.C. §119 of Austrian Application No. GM 465/2009 filed on Jul. 23, 2009, the disclosure of which is incorporated by references. The international application under PCT article 21(2) was not published in English.

A cyclone for separating solid particles from an exhaust gas flow, comprising a housing with a jacket area that is preferably cylindrical at least in some sections, a cover area and a bottom area, an inlet opening for feeding the cyclone, and an exhaust gas line opening into said inlet opening for the exhaust gas flow mixed with solid particles, and a discharge opening for the solid particles separated from the exhaust gas flow, wherein an immersion pipe is provided which passes through the cover area or the bottom area, and comprises an open end area which protrudes into the interior of the housing and which is used as an outlet opening for the purified exhaust gas flow from the housing, and a method for separating solid particles from an exhaust gas flow by means of a cyclone, wherein the exhaust gas flow transported in the exhaust gas line and containing solid particles to be separated is guided through a housing of the cyclone and is finally removed out of the housing through an outlet opening, wherein the solid particles ejected against the inner wall of the housing by the centrifugal forces will descend in the course of the guidance of the exhaust gas flow and will be discharged through a discharge opening provided in the housing.

Cyclones for separating solid materials or dusts from an exhaust gas flow are already sufficiently known from the state of the art.

A generic cyclone disclosed in DE 601 17 051 4 example comprises a substantially perpendicularly arranged housing of steel sheet for example, the interior of which is delimited by a substantially cylindrical jacket area, the cover area and a bottom area.

The housing comprises an inlet opening which is arranged as an opening in the jacket area of the cyclone and via which the cyclone is supplied, i.e. via which gas flows can be conveyed into the interior of the cyclone.

The exhaust gas flow which is mixed with solid particles and is to be cleaned is conveyed in an exhaust gas line towards the cyclone. The exhaust gas line opens into the inlet opening. The exhaust gas line and the cyclone are usually aligned in such a way that the supply of the exhaust gas flow to be purified occurs tangentially with respect to an imaginary circle which is concentric in relation to the axis of the cyclone.

The outlet opening of the cyclone is formed by an open end area of an immersion pipe which protrudes into the interior of the housing and penetrates the cover area or bottom area, depending on the position of the cyclone in the operating position. The cyclone will usually but not necessarily be operated in such a way that the immersion pipe is arranged to penetrate the cover area of the cyclone.

While the exhaust gas flow passes through the interior of the housing on a substantially spiral path, the solid particles which are entrained in the exhaust gas flow are ejected by centrifugal forces against the inner wall of the housing and will descend as a result of gravity into the bottom region of the housing and via at least one outlet opening into a connected separation vessel.

The solid particles collected in the separation vessel of the housing will subsequently be removed and can be briquetted for example and used as fuel.

The increasing environmental awareness and the closing of cycles and reclamation of input materials demanded in the cause of technical process optimisations place increased demands on industrial separation technology.

In addition to the method of dedusting by means of centrifugal force by the described cyclones, e-filters and bag filters are especially available on the market. Although the latter are characterised by a high dedusting performance, this can only be achieved under the condition of considerable operating and energy costs.

In contrast to this, dedusting by centrifugal force or cyclones has a much simpler functional principle and requires less power and resources, which is also considered advantageous with respect to environmental aspects. However, the separation effect and the separation performance that can be achieved with conventional cyclones are often no longer sufficient to meet current standards and statutory requirements.

One of the main reasons for this is a boundary layer flow which has a concentration of solid particles which is increased in relation to the exhaust gas flow and which is formed in the region of the bottom or cover area of the cyclone penetrated by the immersion pipe and along the jacket surface of the immersion pipe protruding into the interior of the cyclone.

Said boundary layer flow is produced by friction of the exhaust gas flow in the described areas. The exhaust gas flow which rotates in a substantially spiral manner in the interior of the housing therefore comes close to a standstill in the region of the immersion pipe, so that the undesirable boundary layer flow is formed by the congestion resulting therefrom.

It is the purpose of the immersion pipe to prevent the accumulation of solid particles present in the boundary layer flow from reaching an outlet opening of the housing arranged in the bottom or cover area. Said outlet opening is displaced further into the interior of the cyclone by using an immersion pipe.

However, turbulence mixtures of the boundary layer flow occurring within the cyclone with the purified exhaust gas flow which is discharged through the outlet opening continue to cause a discharge of the solid particles from the boundary layer flow through the outlet opening, even though the discharge is lower than without the use of an immersion pipe.

In other words, the forming boundary layer flow causes the discharge of solid particles via the actually purified exhaust gas flow, by means of which the separation performance of the cyclone is negatively influenced.

Measures have already been proposed in order to reduce the dust content of the boundary layer flow occurring within the cyclone or to destroy the boundary layer flow. They have not yielded any satisfactory results however. Efforts were undertaken to suck off the boundary layer loaded with the solid particles and to reintroduce the same back into the interior of the cyclone at a point remote from the outlet opening.

It is further known to inject pure air by means of nozzles in the cover area of the site housing into the interior of the cyclone and to swirl the boundary layer flow in this way.

The swirls produced in combating the boundary layer lead to a counter-productive effect concerning the separation of the solid particles.

FR 2 281 791 A must also be regarded in this connection, which discloses a cyclone with a feed device for acceleration air in or on the feed element in order to destroy the boundary layer flow.

DE 29 25 245 A1 discloses a cyclone with a worm comprising two spirals, with the first spiral being charged with an exhaust gas flow and the second spiral with pure gas. The pure gas is conveyed separately from the exhaust gas flow into the cyclone.

DE 42 17 016 A1 discloses an immersion pipe for cyclones. The provision of a pure gas line is not disclosed.

DE 43 13 337 A1 discloses a cyclone with an inflow channel inclined against its axis of symmetry. The supply of pure gas is not disclosed.

The present invention is based on the object of avoiding the disadvantages of conventional cyclones and of enabling an improved separation of solid particles from an exhaust gas flow guided in the cyclone and contaminated with solid particles by measures for combating the boundary layer flow which has an increased concentration of solid particles.

This object is achieved by an apparatus and a method in accordance with the invention.

A generic cyclone for separating solid particles from an exhaust gas flow comprises a housing with a jacket area that is preferably cylindrical at least in some sections, a cover area and a bottom area, an inlet opening for feeding the cyclone, and an exhaust gas line opening into said inlet opening for the exhaust gas flow mixed with solid particles, and a discharge opening for the solid particles separated from the exhaust gas flow, wherein an immersion pipe is provided which passes through the cover area or the bottom area and comprises an open end area which protrudes into the interior of the housing and which is used as an outlet opening for the purified exhaust gas flow from the housing. In accordance with the invention, at least one pure gas line used to feed pure gas is provided, with said pure gas line either opening into an inlet area provided in the exhaust gas line before the inlet opening as viewed in the flow direction of the exhaust gas flow, or opening directly into the inlet opening, and said pure gas being fed to an inner wall section of the housing, at which inner wall section a boundary layer flow having an increased concentration of solid particles compared to the exhaust gas flow mixed with solid particles would develop if the pure gas were not supplied.

An opening in the jacket area of the cyclone is understood to be an inlet opening, through which gas flows can enter the interior of the cyclone.

A fluid shall be understood in this connection as a pure gas which has a higher purity or a lower fraction of solid particles than the exhaust gas flow to be purified by means of the cyclone. Ambient air is preferably used as pure gas.

In accordance with the invention, the pure gas is used to replace the boundary layer flow which has negative effects on the achievable degree of separation and has a higher concentration of solid particles or, in other words, pure gas is guided to the inner wall section in the interior of the cyclone on which the boundary layer flow loaded with solid particles would form under normal conditions, so that the boundary layer flow will be formed merely with pure gas or with a high fraction of pure gas without or with a lower solid particle concentration.

It is regarded as relevant that the pure gas is not injected directly into the boundary layer, but that the pure gas will be guided into the cyclone in such a way that the exhaust gas flow is influenced as little as possible, which means that the pure gas virtually is allowed to become a component of the exhaust gas flow without causing any mixture thereof. This can only be achieved if the pure gas is adjusted to the flow behaviour of the exhaust gas flow in good time concerning the direction of flow and the speed of flow, and the introduction of the pure gas flow into the exhaust gas flow occurs without any turbulences if possible, so that the two flows can be introduced into the cyclone in a laminar manner adjacent to one another.

It is therefore necessary in accordance with the invention to guide the pure gas flow either directly into the inlet opening or into the exhaust gas flow preferably already before the inlet opening. The earlier the pure gas can adjust to the flow properties of the exhaust gas flow, the better the pure gas can be supplied to the inner wall section of the cyclone where usually the negatively acting boundary layer flow having an increased concentration of solid particles would be formed.

In accordance with the invention, said inner wall section concerns the inside surface the cyclone which is formed by the cover or bottom area penetrated by the immersion pipe and the adjacent jacket of the immersion pipe penetrating the interior of the housing.

In the event that the pure gas line enters the exhaust gas line for the inlet opening, it is provided according to an especially preferred variant of the invention that the orifice area for the pure gas line is arranged on the cross-sectional half of the exhaust gas line which is closer to the section of the housing which is penetrated by the immersion pipe, as seen in a direction of view following the longitudinal axis of the exhaust gas line.

This provides the possibility to allow the pure gas to be entrained by the exhaust gas stream with simultaneous minimisation of the distance which the pure gas needs to cover up to the aforementioned inner wall section.

It can additionally be provided according to a further preferred embodiment of the invention that a guide apparatus is arranged in the region of the inlet opening of the house and/or in the orifice region of the pure gas line into the exhaust gas line, which guide apparatus guides the pure gas in the direction of the aforementioned inner wall section.

Notice must be taken in principle that the provision of guide apparatuses is not mandatory in order to guide the pure gas to the aforementioned inner wall section because the person skilled in the art, when having knowledge about the flow conditions of the exhaust gas flow, can already ensure by suitably selecting the position of the orifice area and the choice of the flow speed and flow direction with which the pure gas is introduced directly into the cyclone via the inlet opening or into the exhaust gas line via the orifice area that the pure gas is supplied to the aforementioned inner wall section.

It is provided in an embodiment of the invention which is advantageous with respect to production and flow that the pure gas line forms a partial cross-section of the exhaust gas line at least in sections and the same is arranged as a shaft element, with at least one separating wall being arranged within the shaft element which separates the pure gas from the exhaust gas flow.

One embodiment is especially preferable in this respect in which the at least one separating wall extends at least in sections parallel to a preferably horizontally extending longitudinal axis of the shaft element. Preferably, the shaft element has a rectangular cross-section, with the separating wall being arranged as a plate which is adjacent with its lateral edges to two side walls of the shaft element which extend substantially perpendicularly.

It is provided according to a further preferred embodiment of the invention that the cover area or bottom area of the housing of the cyclone converges in a planar manner into a side wall of the exhaust gas line or the pure gas line.

It is thereby ensured that the pure gas or the major part of the introduced pure gas is guided along the side wall directly onto the aforementioned inner wall area of the cyclone and can form the boundary layer flow there.

In another aspect, the invention also provides a method for separating solid particles from an exhaust gas flow by means of a cyclone, with the exhaust gas flow which is conveyed in an exhaust gas line and contains the solid particles to be separated being guided through the housing of the cyclone and finally being removed out of the housing through an outlet opening, with the solid particles ejected against the inner wall of the housing by the centrifugal forces descending in the course of the guidance of the exhaust gas flow through the housing and being discharged through a discharge opening provided in the housing. It is provided in accordance with the invention that pure gas is supplied before or during entrance into the housing to the exhaust gas flow conveyed in the exhaust gas line and containing the solid particles to be separated, which pure gas is subsequently supplied to an inner wall section of the housing on which a boundary layer flow would form which without the supply of the pure gas would have a concentration which is increased over the exhaust gas flow mixed with the solid particles.

The advantages achieved thereby are obtained analogously to the advantages already mentioned in connection with the apparatus claims.

In order to ensure the lowest possible swirling of the pure gas flow with the contaminated exhaust gas flow guided in the exhaust gas line, it is provided according to a preferred embodiment of the method that the pure gas is guided prior to entrance into the housing of the cyclone at least in sections substantially parallel to the direction of flow of the exhaust gas flow.

In accordance with a further preferred variant of the method, the pure gas is guided in a substantially tangential manner into the housing. A substantially spiral in flow of the pure gas flow into the housing is obtained, which is advantageous from a flow viewpoint.

In accordance with the invention, the pure gas can either be injected or sucked in by means of a fan, depending on the location where the fan is arranged.

An especially economical dedusting is achieved in such a way that according to a preferred embodiment of the method in accordance with the invention the quantity of pure gas supplied to the exhaust gas flow is 1 to 5%, preferably 2 to 3% (by volume), of the gas volume flow entering the cyclone.

It is provided according to a further preferred embodiment of the invention that the temperature of the pure gas is lower than the temperature of the exhaust gas flow, by means of which the thermal stress on the immersion pipe can also be reduced and its service life can thereby be extended.

An especially preferred embodiment of the invention provides that the flow speed of the pure gas in the region of the entrance into the cyclone is 80% to 120%, preferably 90% to 110%, of the flow speed of the exhaust gas flow. Under these conditions, the forming boundary layer flow is composed virtually exclusively of pure gas.

The invention will be explained in closer detail by reference to an embodiment, wherein:

FIG. 5 shows a horizontal sectional view of an alternative embodiment of a cyclone in accordance with the invention along the line of intersection A-A in FIG. 3.

Figure 1:
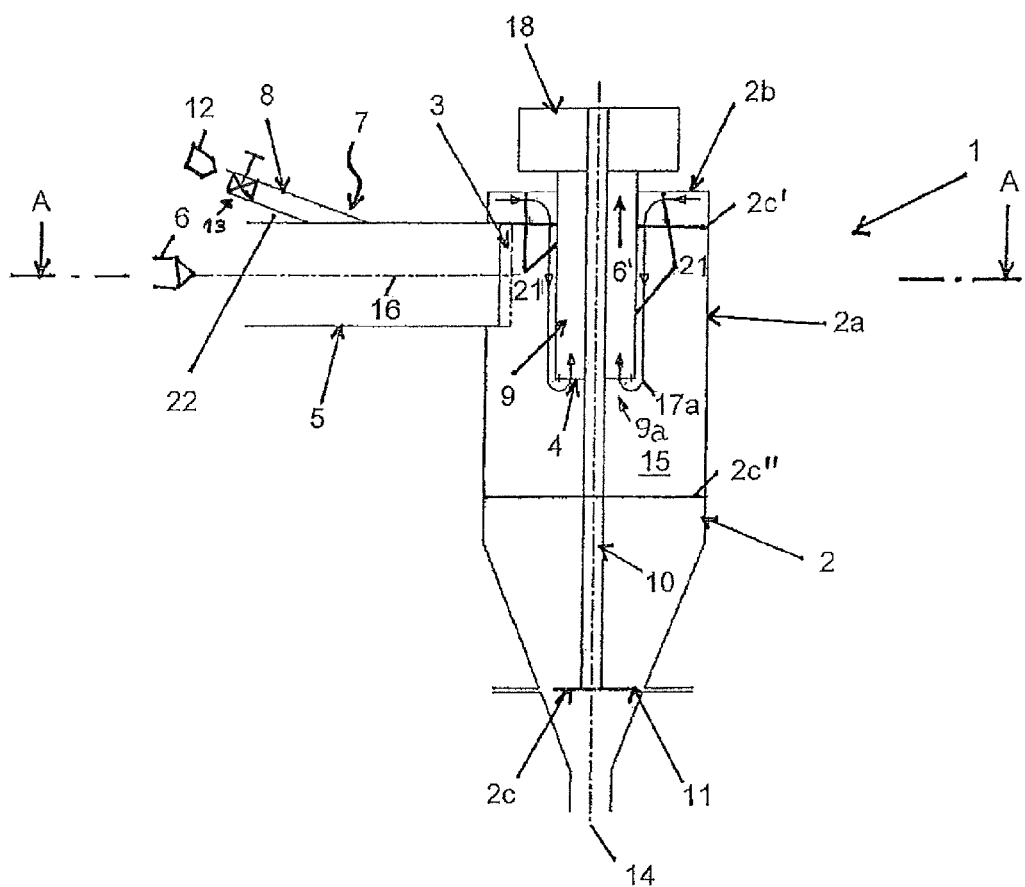
FIG. 1 shows a schematic vertical sectional view of a cyclone in accordance with the invention.

FIG. 1 shows a 1st embodiment of a cyclone 1 in accordance with the invention, comprising a substantially perpendicularly arranged housing 2 which is made of steel sheet and comprises a substantially cylindrical or tubular jacket area 2a which is closed off on its upper face side by a cover area 2b and on its bottom face side by a bottom area 2c.

The housing 2 comprises an inlet opening 3 in a section of the jacket area 2a which is adjacent to the cover area 2b, by means of which an exhaust gas flow 6 can be supplied into the interior 15 of the cyclone 1. In the present embodiment, a shaft-like and substantially horizontally extending exhaust gas line 5 for an exhaust gas flow 6 to be purified opens into the inlet opening 3. The exhaust gas flow 6 which enters the housing 2 of the cyclone 1 is contaminated and comprises a certain amount of solids such as dust or soot particles.

Notice must be taken at this point that for production reasons the jacket area 2a or a section thereof can also be a physical component of the exhaust gas line 5, as is indicated in FIG. 1 by way of example by the lines 2c', 2c'', by means of which a section of the jacket area 2a and the exhaust gas line 5 could also be produced integrally. Within the terms of the present invention however, the jacket area 2a or the section thereof is regarded as belonging to the cyclone even in such an embodiment and the inlet opening 3 is defined as the opening into said jacket area 2a.

Figure 2:
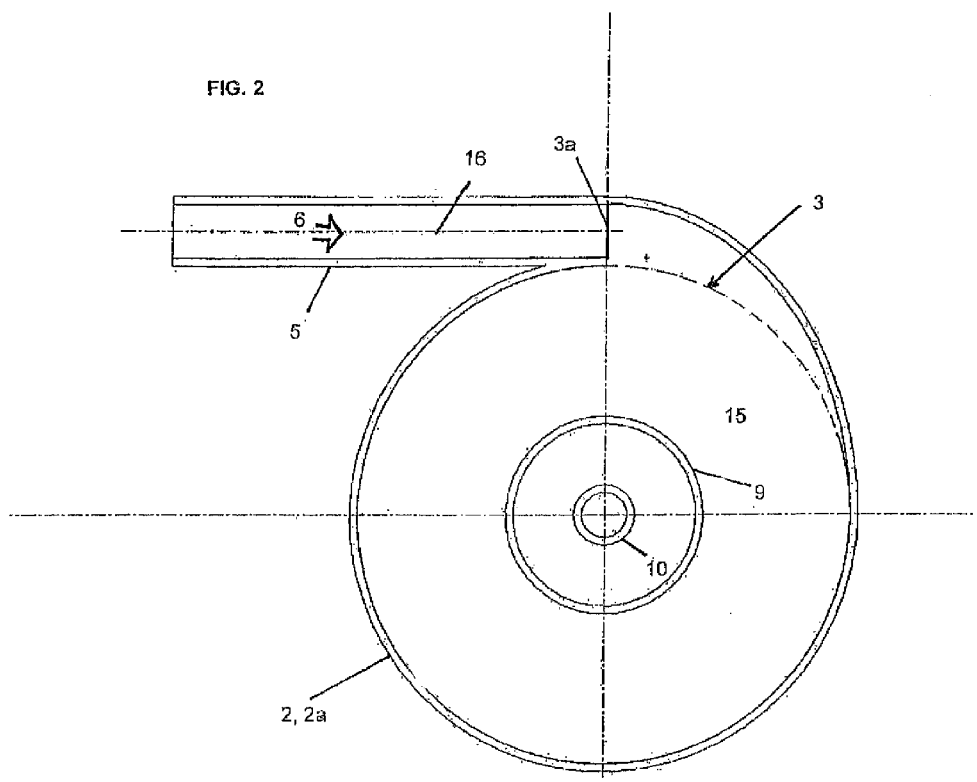
FIG. 2 shows a horizontal sectional view of an embodiment of a cyclone in accordance with the invention along the line of intersection A-A in FIG. 1.
Figure 4:
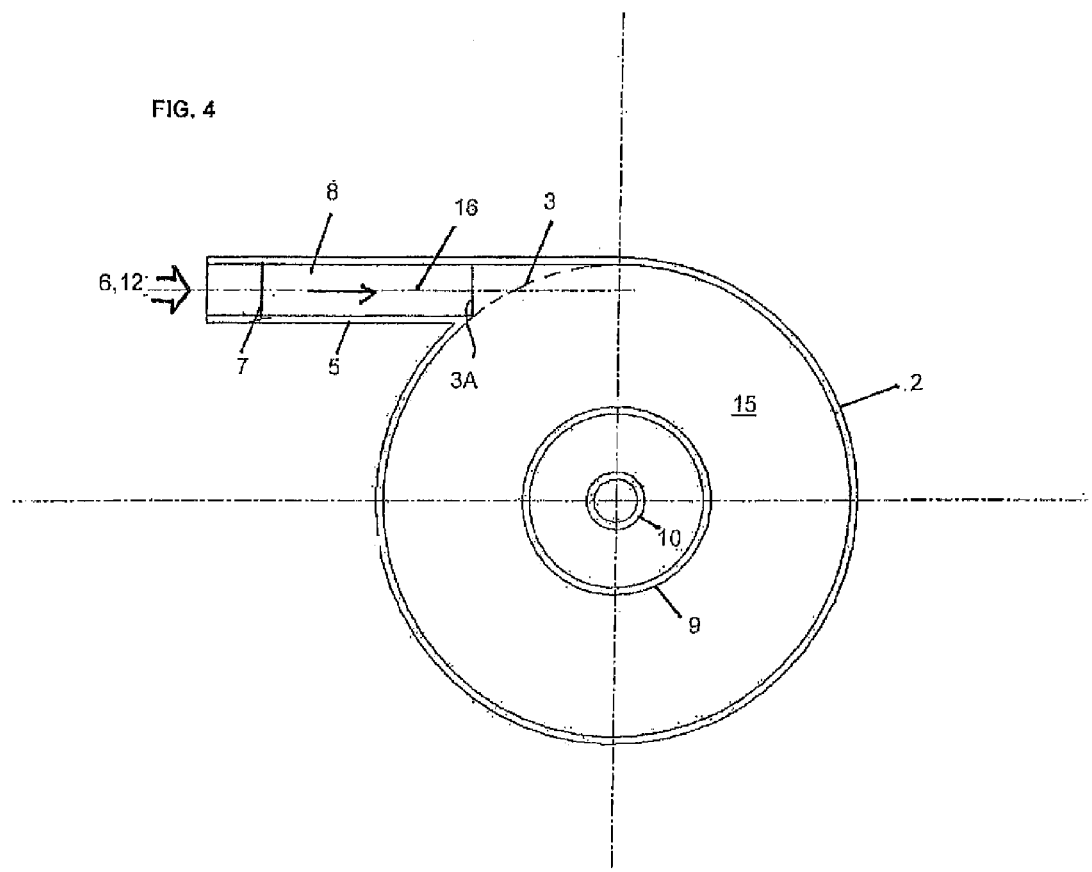
FIG. 4 shows a horizontal sectional view of an alternative embodiment of a cyclone in accordance with the invention along the line of intersection A-A in FIG. 3.

FIG. 2, FIG. 4, and FIG. 5 show inlet openings 3 which have different geometries (shown with a broken line). In a preferred embodiment of the invention, the cross-sectional plane designated with reference numeral 3a of the exhaust gas line 5 is regarded in FIGS. 2, 4 and 5 as the entrance opening 3. It concerns the last complete cross-sectional plane 3a of the exhaust gas line 5 which extends normally to the longitudinal axis 16 of the exhaust gas line 5. Since a relevant precondition for the displacement of the boundary layer flow having an increased concentration of solid particles by a boundary layer flow that is less contaminated is an adjustment of the pure gas flow to the exhaust gas flow in due time, it is necessary in the majority of cases that such an adjustment already occurs in the exhaust gas line 5.

The interior 15 which is enclosed by the jacket area 2a, the cover area 2b and the bottom area 2c is used as an expansion chamber for the exhaust gas flow 6 exiting from the exhaust gas line 5.

The inlet opening 3 and the exhaust gas line 5 are arranged in such a way that a substantially tangential inflow of the exhaust gas flow 6 occurs into the substantially cylindrical cross-section of the housing 2. The substantially horizontal longitudinal axis 16 of the exhaust gas line 5 therefore extends in an offset manner and is arranged in a normal plane relative to a substantially vertical longitudinal axis 16 of the housing 2.

The housing 2 of the cyclone 1 further comprises an outlet opening 4, through which the exhaust gas flow 6' is discharged again, which exhaust gas flow is guided in a substantially spiral manner through the interior 15 of the housing 2 and is purified thereby.

The outlet opening 4 is formed by a substantially cylindrical immersion pipe 9, which protrudes with an open end area 9a into the interior 15 of the housing 2. As is shown in FIG. 1, a discharge element 18 is arranged on the outside of the cover area 2b of the housing. Discharge element 18 which is connected to a transport pipe (not shown) deflects the purified exhaust gas flow 6' which flows in the vertical direction through the immersion pipe 9 into a horizontal direction for example.

The solid particles which are ejected by centrifugal forces against the inner wall of the housing 2 will be collected in the bottom area 2c of the housing 2 and discharged through a discharge opening 11 in the form of a ring gap for example to a connected separation vessel 22, from where further processing can occur.

In order to support a flow of the exhaust gas flow 6 through the interior 15 of the housing 2 with the lowest possible amount of swirling, a cylindrical guide pipe 10 is preferably but not mandatorily provided, which guide pipe extends coaxially to the longitudinal axis 14 of cyclone and which extends from the bottom area 2c up to the cover area 2b.

The conveyance of the exhaust gas flow 6 can occur either by a downstream air suction fan (not shown) or an upstream compressor (not shown).

In the present embodiment, the immersion pipe 9 penetrates the cover area 2b of the housing 2.

Figure 3:
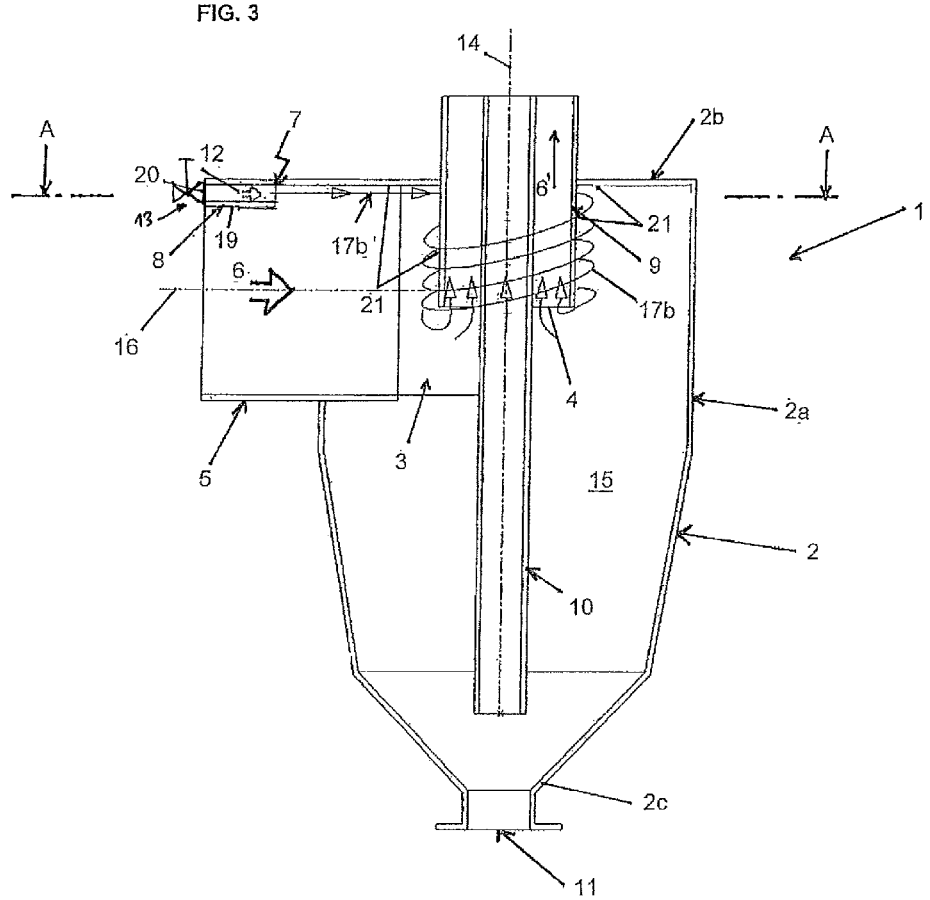
FIG. 3 shows a schematic vertical sectional view of an alternative embodiment of a cyclone in accordance with the invention.

A boundary layer flow 17 which is caused by the flow and which has an increased concentration of solid particles as compared with the exhaust gas flow 6 which is mixed with solid particles is formed in the cover area 2b and in the area of the jacket surface of the immersion pipe 9. These areas of the inner wall section on which the boundary layer flow 17 is formed are designated for reasons of simplicity with reference numeral 21. FIG. 1 schematically shows the boundary layer flow 17 in the form of the absolute mass flow 17a; FIG. 3 shows the actual direction of movement 17b of the forming boundary layer flow 17.

As is schematically shown in FIG. 1, turbulences in the interior 15 of the cyclone lead to the consequence that the solid particles which are present in a concentrated manner in the boundary layer flow are conveyed into the inlet opening 4 and will contaminate the actually purified exhaust gas flow 6' again.

In accordance with the invention, at least one pure gas line 8 which conducts a pure gas 12 is provided, which opens into an inlet area 7 of the exhaust gas line 5 which is upstream of the inlet opening 3 of the housing 2 and therefore opens into the interior of the exhaust gas line 5. Air is preferably used as a pure gas 12.

The pure gas 12 will subsequently be supplied to the inner wall section 21 of housing 2, on which the boundary layer flow 17 would be formed, which without the supply of the pure gas 12 would have an increased concentration of solid particles as compared with the exhaust gas stream 6 which is mixed with the solid particles.

The supply to the desired inner wall section 21 can occur in different ways.

By choosing the flow speed of the pure gas and the angle 22 between the axis 16 of the exhaust gas line and the axis of the pure gas line it can be effected that the pure gas is entrained by the exhaust gas flow in such a way that it is conveyed to the desired inner wall section 21.

As an alternative to this, guide apparatuses 13 shown in FIGS. 1 and 3 can be provided which cause a respective deflection of the pure gas. Guide apparatuses 13 can for example be formed as gate valves or sliding plates. Guide apparatuses 13 serve as regulatory means for the flow speed of the pure gas and are used to align the flow speed of the pure gas with the flow speed of the exhaust gas, so that the pure gas flow 12 and the exhaust gas flow 6 can enter the cyclone 1 in a laminar manner adjacent to one another.

As is shown in FIG. 1, the inlet area 7 for the pure gas line 8 is arranged on the cross-sectional half of the exhaust gas line which, when viewed in a direction of view following the longitudinal axis 16 of the exhaust gas line 5, is closer to the section of the housing 2 which is penetrated by the immersion pipe 9, which corresponds to the cover area 2b in the case of the embodiment according to FIG. 1.

FIG. 3 shows an especially preferred embodiment of a cyclone in accordance with the invention, according to which the pure gas line 8 forms a partial cross-section of the exhaust gas line 5 in sections. The exhaust gas line 5 is arranged in this embodiment as a shaft 20, within which a separation wall 19 is provided which separates the pure gas 12 from the exhaust gas flow 6.

The separation wall 19 ends before the inlet opening 3, but can also be arranged to extend up to the inlet opening 3, so that in this case the pure gas is supplied to the exhaust gas flow only upon entrance into the housing 2 of the cyclone 1 and not before such entrance. This separation wall 19 further extends preferably horizontally and parallel to the direction of flow of the exhaust gas flow 6. Since the shaft element 20 according to FIG. 1 has a rectangular cross-section, the separation wall 19 is arranged as a plate which is adjacent in a sealing manner with its side edges to two side walls of the shaft element 20 which extend in a substantially perpendicular manner.

In the embodiment as shown in FIG. 3, the cover area 2b and a side wall of the exhaust gas line 5 form a continuous plane, which facilitates the formation of the boundary layer flow by the pure gas.

In order to achieve the best possible adjustment of the pure gas flow 12 to the exhaust gas flow 6 it is provided that the pure gas flow 12 is guided substantially parallel to the direction of flow of the exhaust gas flow 6 directly before its entrance into the housing 2.

In the present embodiments, the pure gas 12 is introduced in a substantially tangential manner into the cyclone 1.

Tests have shown that optimal dedusting of the gas flow 6 occurs when the quantity of pure gas supplied to the exhaust gas flow 6 is 1 to 5%, preferably 2 to 3%, of the gas volume flow entering the housing 2.

An especially optimal formation of the boundary layer flow by the pure gas is obtained when the flow speed of the pure gas 12 in the inlet area into the cyclone, i.e. in the area of the inlet opening 3, is 80% to 120%, preferably 90% to 110%, of the flow speed of the exhaust gas flow 6.

LIST OF REFERENCE NUMERALS

1 Cyclone
2 Housing
2a Jacket area
2b Cover area
2c Bottom area
3 Inlet opening
3a Last complete cross-section of the exhaust gas line normal to the longitudinal axis of the exhaust gas line
4 Outlet opening
5 Feed line
6 Exhaust gas flow (unpurified)
6' Exhaust gas flow (purified)
7 Inlet area of the pure gas flow into the exhaust gas flow
8 Pure gas line
9 Immersion pipe
10 Guide pipe
11 Discharge opening (for solid particles)
12 Pure gas flow
14 Longitudinal axis of the housing 2
15 Interior of housing 2
16 Longitudinal axis of the exhaust gas line 17 Boundary layer flow
17a Schematic illustration of the absolute mass flow of the boundary layer flow
17b Direction of movement of the boundary layer flow
18 Discharge element for the purified exhaust gas flow 6'
19 Separation wall
20 Shaft element
21 Inner wall section of housing 2
22 Angle between the axis of the exhaust gas line and the axis of the pure gas line

The invention claimed is:

1. A cyclone for separating solid particles from an exhaust gas flow, the cyclone comprising:
 a housing with a jacket area that is cylindrical at least in some sections, a cover area and a bottom area;
 an inlet opening for feeding the cyclone;
 an exhaust gas line opening into said inlet opening for the exhaust gas flow mixed with solid particles;
 a discharge opening for the solid particles separated from the exhaust gas flow;
 wherein an immersion pipe is provided which passes through the cover area or the bottom area, and comprises an open end area which protrudes into an interior area of the housing and which is used as an outlet opening for purified exhaust gas flow from the housing;
 wherein at least one pure gas line is provided to supply pure gas, with said at least one pure gas line either opening into an inlet area provided in the exhaust gas line before the inlet opening as viewed in a flow direction of the exhaust gas flow or opening directly into the inlet opening;
 wherein said pure gas is fed to an inner wall section of the housing, at which inner wall section a first boundary layer flow having an increased concentration of solid particles as compared to the exhaust gas flow mixed with solid particles would develop if the pure gas were not supplied;
 wherein the cover area or the bottom area of the housing converges in a planar manner into a side wall of the exhaust gas line in order to form a second boundary layer flow of the pure gas at the inner wall section; and
 wherein said second boundary layer flow replaces the first boundary layer flow having an increased concentration of solid particles.

2. The cyclone according to claim 1, wherein the inner wall section of the cyclone concerns an inner surface of the cyclone formed by the cover area or the bottom area of the housing penetrated by the immersion pipe and an adjacent jacket of the immersion pipe which protrudes into the interior of the housing.

3. The cyclone according to claim 1, wherein the inlet area for the at least one pure gas line is arranged on a cross section of the exhaust gas line which, when viewed in a direction of view following a longitudinal axis of the exhaust gas line, is closed to a section of the housing which is penetrated by the immersion pipe.

4. The cyclone according to claim 1, wherein a guide apparatus is provided in an area of the inlet opening of the housing and/or the inlet area, via which the pure gas guided through the exhaust gas line can be guided toward the inner wall section.

5. The cyclone according to claim 1, wherein the pure gas line forms a partial cross-section of the exhaust gas line at least in sections; and wherein the exhaust gas line is arranged as a shaft element, with at least one separation wall being arranged within the shaft element which separates the pure gas from the exhaust gas flow.

6. The cyclone according to claim 5, wherein the at least one separation wall extends at least in sections parallel to a longitudinal axis of the shaft element, and the separation wall is arranged as a plate which is adjacent with its lateral edges to two side walls of the shaft element which extend substantially perpendicularly.

7. The cyclone according to claim 1, wherein the cover area or the bottom area of the housing converges in a planar manner into a side wall of the at least one pure gas line.

8. A method for separating solid particles from an exhaust gas flow using a cyclone, the method comprising steps of:
 conveying the exhaust gas flow in an exhaust gas line, the exhaust gas flow containing the solid particles;
 guiding the exhaust gas flow through a housing of the cyclone; and
 removing the exhaust gas flow out of the housing through an outlet opening;
 wherein the solid particles are ejected against an inner wall of the housing by centrifugal forces while the exhaust gas flow descends and is guided through the housing;
 wherein the solid particles are discharged through a discharge opening provided in the housing;
 wherein pure gas is supplied to the exhaust gas flow before or during entrance of the exhaust gas flow into the housing, which pure gas is subsequently supplied to an inner wall section of the housing, wherein a first boundary layer flow having an increased concentration of solid particles as compared to the exhaust gas flow mixed with solid particles would form at the inner wall section if the pure gas were not supplied;
 wherein a supplied quantity of the pure gas is adjusted to a flow direction and a flow speed of the exhaust gas flow;
 wherein a second boundary layer flow of pure gas is formed on the inner wall section; and
 wherein said second boundary layer flow replaces the first boundary layer flow.

9. The method according to claim 8, wherein prior to entrance of the pure gas into the housing the pure gas is guided at least in sections substantially parallel to the flow direction of the exhaust gas flow.

10. The method according to claim 8, wherein the pure gas is guided substantially tangentially into the housing.

11. The method according to claim 8, wherein the pure gas is injected.

12. The method according to claim 8, wherein the pure gas is sucked in by a suction device disposed downstream of the cyclone.

13. The method according to claim 8, wherein the supplied quantity of pure gas is 1 to 5% (percent by volume) of the exhaust gas flow entering the housing and containing the solid particles to be separated.

14. The method according to claim 8, wherein air is used as the pure gas.

15. The method according to claim 8, wherein the pure gas has a lower temperature as compared to the exhaust gas flow.

16. The method according to claim 8, wherein a flow speed of the pure gas at the entrance into the cyclone is 80% to 120% of the flow speed of the exhaust gas flow.

* * * * *